United States Patent Office 3,441,004
Patented Apr. 29, 1969

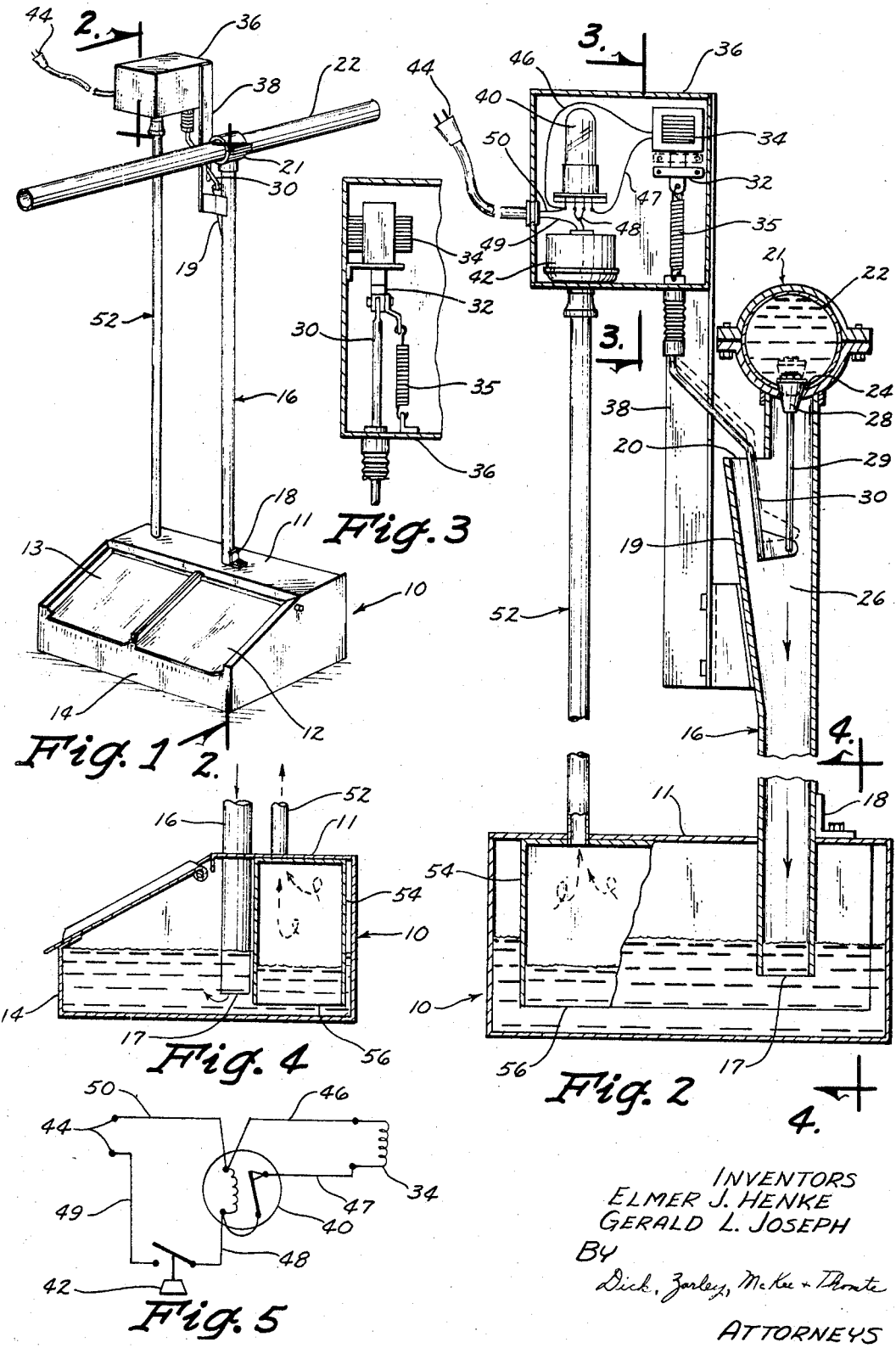

3,441,004
LIQUID FEEDER DEVICE
Elmer J. Henke and Gerald L. Joseph, Columbus, Nebr., assignors to Behlen Manufacturing Company, Inc., Columbus, Nebr., a corporation of Nebraska
Filed Dec. 23, 1966, Ser. No. 604,401
Int. Cl. A01k 7/02
U.S. Cl. 119—72    8 Claims

ABSTRACT OF THE DISCLOSURE

A liquid feeder device which automatically maintains a constant level of liquid feed or water in a livestock feeding receptacle. The feeding receptacle is positioned below a supply container and is adapted to receive the feed through a valve means positioned therebetween. An air pressure switch is in communication with an air chamber in the feeding receptacle and is operatively connected to the valve means to control the operation of the same to regulate the level of water or feed in the receptacle. A safety means is also provided to de-energize the valve means if the air pressure switch fails to function properly.

---

One of the problems encountered when feeding livestock is that of keeping feed and water readily available to the animals at all times to insure their maximum growth. One way of keeping feed and water readily available is to provide a means for automatically replenishing the supply of feed in the feeding receptacle as the animals consume the feed. Often these feed level control means operate on the principle of using a float to mechanically control the opening and shutting of a valve to a feed replenishing container. These float operated control means are undependable due to their susceptibility to malfunction when jostled by feeding livestock.

Another problem encountered in automatic feeding devices is that there is no check against malfunctioning of the valve control system. The result of this deficiency is that often the valve is held open to allow feed to overflow the feeding receptacle.

Therefore, the principal object of this invention is to provide a liquid feeder device which will make feed constantly available to livestock.

A further object of this invention is to provide a liquid feeder device which will maintain a constant level of feed in a feeder receptacle.

A further object of this invention is to provide a liquid feeder device which has no moving parts within the feeder receptacle.

A further object of this invention is to provide a feed receptacle which utilizes electricity as a source of power.

A further object of this invention is to provide a feed receptacle which, if it malfunctions, will close off the replenishing supply of food.

A still further object of this invention is to provide a liquid feeder device which is economical of manufacture, durable in use, and refined in appearance.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawings in which:

FIGURE 1 is a perspective view of the device of this invention;

FIGURE 2 is a sectional front elevational view as viewed along line 2—2 of FIGURE 1;

FIGURE 3 is an enlarged sectional view taken on line 3—3 of FIGURE 2;

FIGURE 4 is a sectional view of the feeding receptacle taken on line 4—4 of FIGURE 2; and FIGURE 5 is a schematic drawing of the electrical circuitry in the feeder device.

The numeral 10 generally designates a feeding receptacle having a top 11 and two flap lids 12 and 13 pivotally connected to top 11. Flap lids 12 and 13 extend forwardly and downwardly from top 11 to rest on the front wall 14 of receptacle 10. The bottom edges of flap lids 12 and 13 extend slightly over front wall 14 so that livestock can lift them easily to gain access to the interior of receptacle 10.

An elongated hollow spout member 16 extends through top 11 into the interior of receptacle 10. The bottom end 17 of spout member 16 is open. On one side of spout member 16 is a lip flange 19 forming a downwardly angling access opening 20 in spout 16 which extends inwardly to the hollow center of spout member 16. Bracket means 18 secures spout member 16 to receptacle 10. The upper end of spout member 16 has a clamp means 21 operatively secured thereon. Clamp means 21 is adapted to clamp spout member 16 to a liquid food supply container 22. FIGURES 1 and 2 illustrate a pipe as a liquid food supply container, but any type of liquid container will suffice. Container 22 has an outlet opening 24 in the bottom thereof. Outlet opening 24 extends through clamp 21 into the elongated hollow channel 26 of spout member 16.

Mounted in outlet opening 24 is valve means 28. Valve means 28 is movable between an open position allowing free flow of liquid feed through opening 24 and a closed position blocking flow of liquid feed through opening 24. Extending downwardly from valve means 28 is a valve stem 29 which is positioned within channel 26. Pivotally secured to the bottom end of valve stem 29 and extending upwardly therefrom is arm member 30. Arm member 30 extends upwardly through access opening 20 and then upwardly to have its upper end operatively secured to lifting member 32 of a valve moving means such as solenoid 34. Solenoid 34 is adapted so that when electrically activated it causes lifting member 32 to lift upwardly, pulling with it the arm member 30 and valve means 28. The final result of this action is the rise of valve means 28 from its seated position in outlet opening 24, thereby allowing the flow of liquid fed through outlet opening 24. Spring means 35 is secured at one end to box 36 and at the other end to lifting member 32. Thus, spring member 35 yieldably holds lifting member 32 in a downward position which in turn causes valve means 28 to be yieldably held in a closed seated position within outlet opening 24.

Solenoid 34 is rigidly secured inside box 36. Box 36 is rigidly secured to frame bar 38, and frame bar 38 is rigidly secured to to spout member 16. Also secured within box 36 are a timer device 40 and an air pressure switch 42 of conventional construction. An electrical plug means 44 is adapted to be plugged into a power supply not shown in the drawings. Electroconducting wires 46, 47, 48, 49 and 50 connect solenoid 34 electrically to plug means 44, timer device 40, and air pressure switch 42. Timer device 40 and switch 42 are so positioned in the circuit that they are capable of cutting the flow of current to solenoid 34 from plug means 44. The timer 40 is a thermostatic delay relay timer of conventional construction and is adapted to de-energize the solenoid 34 after a predetermined length of time if the air pressure switch 42 fails to function properly.

An air pipe 52 extends downwardly from air pressure switch 42 through top 11 of receptacle 10, and is connected with an air chamber 54. Air chamber 54 is completely enclosed on all sides except for its open bottom 56. Air pipe 52 is connected to air chamber 54 so that there is free communication of air from within chamber 54 upwardly through air pipe 52 to air pressure switch 42.

The method of operation of the liquid feeding device is as follows: When plug 44 is connected to a power supply the electric current tries to pass through the above described circuit. Whether it does or not depends upon the condition of pressure switch 42. Pressure switch 42 is is adapted to be sensitive to the air pressure within air chamber 54. When liquid feed surrounds air chamber 54 the open bottom 56 allows the liquid feed to compress the air within chamber 54. As the level of the liquid feed within receptacle 10 rises, the air pressure within air chamber 54 increases. As the level of liquid lowers, the air pressure within air chamber 54 decreases. Thus, there is a unique air pressure within air chamber 54 corresponding with each different level of liquid within receptacle 10. Air pressure switch 42 is set to close the circuit when the air pressure within air chamber 54 falls below a pressure corresponding to the desired level of liquid in receptacle 10. When the air pressure in air chamber 54 is above that predetermined point, the air pressure switch opens and prevents flow of current through the circuit to solenoid 34.

Therefore, when the liquid level within receptacle 10 falls below the desired level, the air pressure within air chamber 54 falls low enough to cause air pressure switch 42 to close the circuit, thereby allowing the activation of solenoid 34. Solenoid 34 then moves lifting member 32 upwardly which in turn causes arm member 30 to be lifted upwardly. By moving upwardly, arm member 30 lifts valve means 28 upwardly thereby unseating it and allowing liquid feed to flow through outlet opening 24, down through spout member 16, and into receptacle 10. As more and more liquid feed flows into receptacle 10, the liquid level in receptacle 10 rises, causing the air pressure within air chamber 54 to rise. When the air pressure within air chamber 54 corresponds to the desired level of liquid, the air pressure switch opens thereby cutting off the current to solenoid 34. Solenoid 34 then releases lifting member 32 and spring member 35 pulls lifting member 32 downwardly. The result is that arm member 30 re-seats valve means 28 in outlet opening 24, thereby blocking the flow of liquid feed from supply container 22 into receptacle 10. Timing device 40 is electrically connected to the above mentioned electrical circuit as a checking device. If a malfunction occurs which causes solenoid 34 to remain activated for an extended period of time, timing device 40 is adapted to break off the circuit, thereby de-activating solenoid 34, which causes the valve means 28 to close. Thus, a malfunction in pressure switch 42 will not permit the liquid from pipe 22 to flow in excessive amounts. Timer 40 renders solenoid 34 in an inoperative condition until plug 44 is disconnected to permit the thermostatic portion of timer 40 to cool.

It is apparent from the foregoing that this invention provides a new and better way of maintaining a constant level of liquid feed in a feeding receptacle. Also from the foregoing it is seen that this device will accomplish all of its stated objectives.

Some changes may be made in the construction and arrangements of my liquid feeder device without departing from the real spirit and purpose of my invention.

I claim:
1. In a liquid feeder device,
  a feed supply container holding liquid feed and having an outlet opening therein,
  a valve means movably mounted in said opening and being movable between a closed position blocking said opening and an open position leaving said opening free from obstruction,
  a feeder receptacle positioned below said supply container for receiving said liquid feed from said outlet opening of said container when said valve means is in said open position,
  a valve moving means connected to said valve means and adapted to be activated to move said valve means from said closed position to said open position,
  a switch means electrically connected to a power supply and said valve moving means, said switch means being responsive to air pressure and being adapted to close and open upon the raising or lowering, respectively, of air pressure to predetermined levels,
  said switch means being in communication with said receptacle whereupon the dropping of the level of said liquid below a predetermined level within said receptacle causes a decrease in air pressure which causes said switch to close and the raising of said liquid feed above said predetermined level causes an increase in air pressure which causes said switch to open,
  said receptacle having means providing an air chamber located therein having an open bottom, said switch means being in communication with the air in said air chamber.

2. The liquid feeder device of claim 1 wherein said valve moving means has means for returning said valve means to said closed position upon deactivation of said valve moving means.

3. The structure of claim 1 wherein said valve moving means includes a solenoid member.

4. The structure of claim 1 wherein a spout member is operatively secured to said supply container over said outlet opening, said spout member being adapted to channel said liquid feed from said supply container to said receptacle.

5. The structure of claim 1 wherein a spout member is secured to said supply container over said outlet opening and extends downwardly to provide communication between the interior of said supply container and said receptacle.

6. The structure of claim 5 wherein said securing means is a clamp member and said supply container is a pipe.

7. In a liquid feeder device,
  a feed supply container holding liquid feed and having an outlet opening therein,
  a valve means movably mounted in said opening and being movable between a closed position blocking said opening and an open position leaving said opening free from obstruction,
  a feeder receptacle positioned below said supply container for receiving said liquid feed from said outlet opening of said container when said valve means is in said open position,
  a valve moving means connected to said valve means and adapted to be activated to move said valve means from said closed position to said open position,
  a switch means electrically connected to a power supply and said valve moving means, said switch means being responsive to air pressure and being adapted to close and open upon the raising or lowering, respectively, of air pressure to predetermined levels,
  said switch means being in communication with said receptacle whereupon the dropping of the level of said liquid below a predetermined level within said receptacle causes a decrease in air pressure which causes said switch to close and the raising of said liquid feed above said predetermined level causes an increase in air pressure which causes said switch to open,
  a thermostatic delay relay timer means electrically connected to said valve moving means adapted to de-activate said valve moving means after said valve moving means has been in an activated state for a predetermined length of time.

8. In a liquid feeder device, a feed supply container holding liquid feed and having an outlet opening therein a valve means movably mounted in said opening and being movable between a closed position blocking said opening and an open position leaving said opening free from obstruction, a feeder receptacle positioned below said supply container for receiving said liquid feed from said outlet opening of said container when said valve means is in said open position, a valve moving means connected to said valve means and adapted to be activated to move said valve means from said closed position to said open position, a switch means electrically connected to a power supply and said valve moving means, said switch means being responsive to air pressure and being adapted to close and open upon the raising or lowering, respectively, of air pressure to predetermined levels, said switch means being in communication with said receptacle whereupon the dropping of the level of said liquid below a predetermined level within said receptacle causes a decrease in air pressure which causes said switch to close and the raising of said liquid feed above said predetermined level causes an increase in air pressure which causes said switch to open, said valve moving means being a solenoid, a thermostatic delay relay timer means electrically connected to said solenoid and adapted to deactivate said solenoid after said solenoid has been in an activated state for a predetermined length of time.

References Cited

UNITED STATES PATENTS

| | | | |
|---|---|---|---|
| 2,865,328 | 12/1958 | Hostetler | 119—79 |
| 2,929,356 | 3/1960 | Bacigalupo | 119—51 |
| 3,225,742 | 12/1965 | Hagans | 119—51.11 |
| 3,233,864 | 2/1966 | Behlen et al. | 119—51 X |
| 3,306,263 | 2/1967 | Johnson | 119—73 |
| 3,334,651 | 8/1967 | Clearman | 137—387 X |

HUGH R. CHAMBLEE, *Primary Examiner.*

U.S. Cl. X.R.

119—51, 51.11